United States Patent [19]

Abrams et al.

[11] Patent Number: 5,169,374
[45] Date of Patent: Dec. 8, 1992

[54] METHOD AND APPARATUS FOR SECURING A POURING SPOUT TO A CONTAINER

[75] Inventors: Robert S. Abrams, Albany, N.Y.; Joseph H. Miller; Paul R. Bird, both of Farmington, Conn.

[73] Assignee: Capitol Spouts, Inc., Fultonville, N.Y.

[21] Appl. No.: 801,896

[22] Filed: Dec. 3, 1991

[51] Int. Cl.⁵ .................................................. B31B 1/90
[52] U.S. Cl. .......................................... 493/87; 29/512; 413/53; 493/344
[58] Field of Search ...................... 493/76, 84, 86, 87, 493/102, 213, 344, 379, 962; 264/252, 295, 339; 413/53; 29/512

[56] References Cited

U.S. PATENT DOCUMENTS

| | | | |
|---|---|---|---|
| 2,972,184 | 2/1961 | Andrew | 493/87 |
| 3,412,919 | 11/1968 | Cain | 493/87 |
| 4,615,655 | 10/1986 | Dixon | 29/512 |
| 4,669,640 | 6/1987 | Ando et al. | |
| 4,795,065 | 1/1989 | Ashizawa | 220/335 |
| 4,813,578 | 3/1989 | Gordon et al. | |
| 4,909,434 | 3/1990 | Jones et al. | |

*Primary Examiner*—Bruce M. Kisliuk
*Assistant Examiner*—Jack Lavinder
*Attorney, Agent, or Firm*—Burns, Doane, Swecker & Mathis

[57] ABSTRACT

A spout is attached to a wall of an article, such as a paperboard container, by pushing a stem of a spout longitudinally through a pre-formed hole in the article and against an inclined face of a flare tool so that a portion of the stem is bent laterally outwardly and into the path of a staking tool. The staking tool is displaced so that the face thereof bends a laterally outer section of the bent portion against the wall of the article while leaving a laterally inner section of the bent portion spaced longitudinally from the wall.

22 Claims, 2 Drawing Sheets

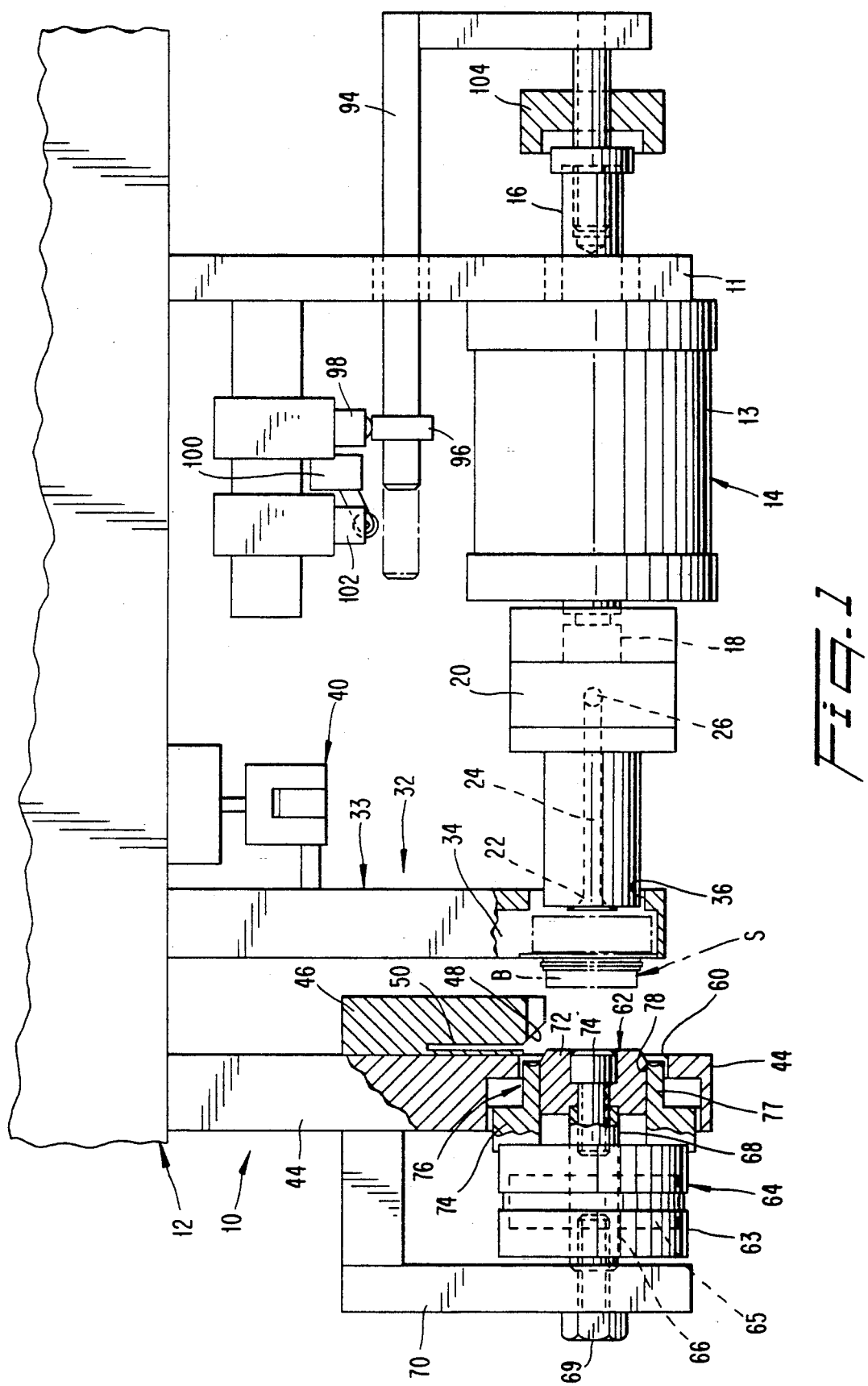

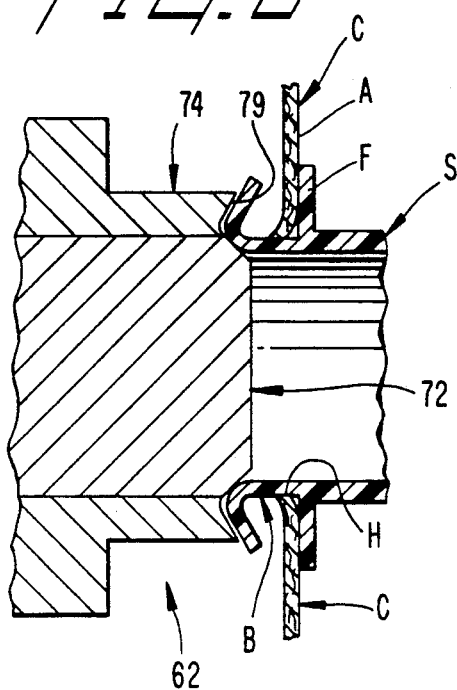
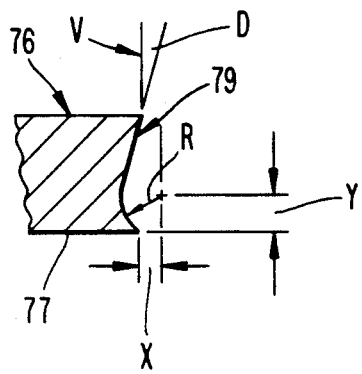
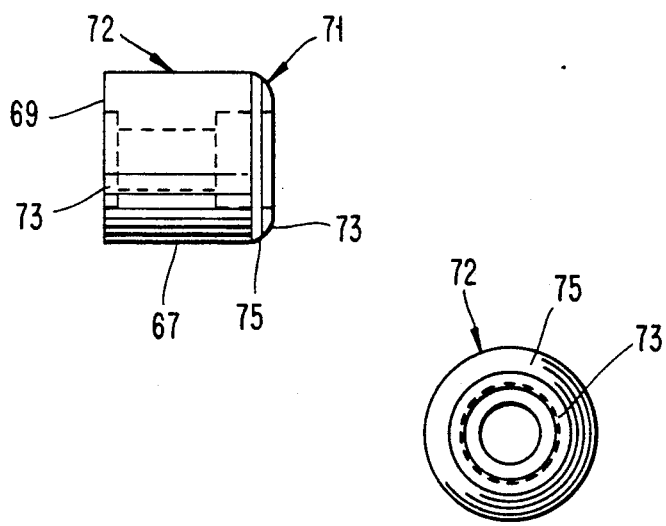
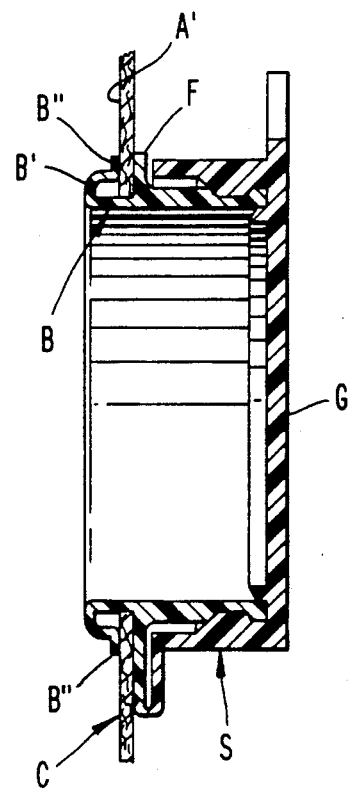

METHOD AND APPARATUS FOR SECURING A POURING SPOUT TO A CONTAINER

FIELD OF THE INVENTION

The present invention relates to methods of and apparatus for attaching objects such as pour spouts to objects such as planar portions of articles. More particularly, the present invention relates to methods of and apparatuses for attaching pour spouts to gable tops of paperboard cartons.

BACKGROUND AND SUMMARY OF THE PRESENT INVENTION

Various apparatus which form and fill gable top paperboard cartons are known in the prior art. For example, the Cherry-Burrell packing machine, Model H-75, is a standard in the field. The Cherry-Burrell machine forms a paperboard carton having four sides and a bottom, partially folds the upper ends of the sides of the carton into a gable top, fills the carton, and completely folds and seals the gable top. The Cherry-Burrell machine operates continuously in an assembly line-type manner, such that cartons are formed and filled one by one in the machine at stations which each perform a small task on the carton in under one second, before the carton moves on to the next station.

Gable top cartons of this type, though, have disadvantages when they are used to store and dispense liquid products such as milk, juice, etc. Specifically, the gable top can often be difficult to open correctly without accidentally tearing the carton, and, when the top is reclosed, it fails to provide a liquid-tight closure and thus allows spillage of the liquid if the carton is accidentally tipped over or shaken.

Accordingly, it has become desirable to place a releasable closure on a sloping side of the gable top in place of opening the gable top, wherein the closure is more easily opened and is liquid-tight when reclosed. For example U.S. Pat. No. 4,669,640 to Ando et al discloses a method of attaching a mouthpiece 34 to a gable top carton 20, wherein the mouthpiece is pushed through an aperture 32 in a sloping side 28 of the gable top carton 20 such that the mouthpiece 34 is held to the side 28 by a flange 46 and retainer lugs 48 of the mouthpiece 34, and wherein the flange 46 is then thermally or ultrasonically fused to the side 28.

U.S. Pat. No. 4,813,578 to Gordon et al also discloses a method of attaching a pour spout 40 to a gable top carton 10, wherein the spout 40 is first placed on the open gable top such that a flange 46 overlies an opening 30 in the gable top, and wherein the flange 46 is then heated and pressed into contact with the gable top such that the flange 46 adheres to the gable top.

Further, U.S. Pat. No. 4,909,434 to Jones et al discloses a method of securing a pouring spout 1 to a sloping side 2 of a gable top carton, wherein a hole is first cut in the sloping side 2, wherein the spout 1 is then inserted into the hole such that a flange 6 thereof extends around the hole, wherein a skirt section 4 of the spout 1 is then heated to bend and form a second flange around an opposite side of the hole, and wherein both of the flanges are heated to bond and seal with the material of the side 2.

The above methods of attaching spouts to gable top containers have the disadvantage, among others, that they employ thermal or ultrasonic devices to fasten a spout to a container. Such methods are accordingly relatively energy intensive and thus expensive, and, due to the time often required for thermal or ultrasonic fastening, may be difficult to integrate into the operation of a packaging machine such as the Cherry-Burrell machine.

In copending, commonly assigned U.S. application Ser. No. 07/657,994, of inventors Abrams, Miller and Nash, filed Feb. 20, 1991, there are disclosed methods of and apparatus for attaching a pour spout to a planar portion of an article which obviates the need for thermal or ultrasonic fastening. In accordance with those methods and apparatus, a hole is punched into a side of a carton which may eventually become a sloping side of the gable top of the carton. Then, a bonding agent is applied to the carton side around the hole, and a spout is inserted into and placed about the hole such that the bonding agent bonds a flange of the spout to the carton side.

In order to optimize the ability of the pour spout to resist dislodgement from the hole under the influence of outward pulling forces (occurring, for example, when a cap of the spout is pulled off by a user), the spout/container configuration has been improved, as disclosed in copending, commonly assigned U.S. application Ser. No. 07/753,855 of inventors Abrams, Miller, and Bird, filed Sep. 3, 1991. As disclosed therein, the spout includes a flange and a stem which extends axially from the flange. The spout is positioned on the container in a manner similar to that disclosed in above-referenced Ser. No. 07/657,994 and such that the flange is adhesively bonded to an exterior surface of a container side and such that the stem extends through the hole in the container side and into the interior of the container. A portion of the stem is turned back toward an interior surface of the container side to produce a mechanical engagement between the turned stem and the container which tends to resist a tendency of the pour spout to be pulled from the container.

In view of the above, it is an object of the present invention to provide a method of and apparatus for attaching spouts to planar portions of articles such as containers wherein a stem of the spout is turned back against an interior side of the article.

It is a further object of the recent invention to provide such a method of and an apparatus for attaching spouts to planar portions of articles, wherein the method and apparatus are relatively non-energy intensive.

It is also an object of the present invention to provide such a method of and apparatus for attaching spouts to planar portions of articles, which are readily integratable into a standard forming and fitting machine, such as a Cherry-Burrell forming and filling machine.

SUMMARY OF THE INVENTION

The above-discussed problems and shortcomings are alleviated by the present invention which relates to a method of and apparatus for attaching a spout to a wall of an article. The method comprises the steps of positioning the article wall and a spout at predetermined positions relative to one another. A stem of the spout is inserted longitudinally through a pre-formed hole in the article wall and against an inclined face of a flared tool so that a portion of the stem is bent laterally outwardly and into a path of a face of a staking tool. Relative movement is produced between the flare tool and the staking tool so that the face of the staking tool bends the bent portion back against the article wall.

Preferably, a laterally outer section of the bent portion is pressed against the wall while leaving a laterally inner section of the bent section spaced longitudinally from the wall.

The staking tool preferably encompasses the flare tool and is slid relative to the stationary flare tool when bending the stem.

It is preferable to insert the stem of the spout through the hole until a lateral flange of the spout abuts against a surface of the article wall disposed opposite a surface of the article wall contacted by the bent portion. Adhesive may be applied to the flange and/or the article wall to adhesively secure the flange to the wall.

The spout is adhered to the applicator preferably by means of air suction.

The method is ideally suited to attaching a spout to a gable top of a paperboard carton.

The present invention also relates to an apparatus for attaching a spout to a wall of an article. The apparatus comprises means for positioning an article wall and a spout at predetermined positions relative to one another. A spout applicator inserts a stem of the spout longitudinally through a pre-formed hole in the article wall. A flare tool has a face arranged to contact the stem once the stem passes through the hole and to bend a portion of the stem laterally outwardly. A staking tool is provided which has a face arranged to oppose the bent portion of the stem. A mechanism is provided for producing relative movement between the flare tool and the staking tool such that the face of the staking tool bends the bent portion of the skirt back against the article wall.

Preferably, the face of the staking tool is configured to bend a laterally outer section of the bent portion of the skirt back against the article wall while leaving a laterally inner section of the bent portion spaced longitudinally from the wall.

Preferably, the face of the staking tool includes a radially inner portion of concave shape defined by a radius of curvature, and a radially outer portion of generally conical shape extending from a radially outer end of the inner portion.

The staking tool preferably encompasses the flare tool and is slidable relative thereto when bending the stem.

The face of the flare tool preferably includes a pair of tapered surfaces arranged coaxially relative to one another. A radially one of the tapered surfaces defines a first cone angle and a radially outer one of the tapered surfaces defines a second cone angle which is larger than the first cone angle. The outer tapered surface extends to an outer periphery of the flare tool.

The apparatus is ideally suited for attaching a spout to a gable top of a paperboard container.

BRIEF DESCRIPTION OF THE DRAWINGS

The objects and advantages of the invention will become apparent from the following detailed description of the preferred embodiment thereof in connection with the accompanying drawings in which like numerals designate like elements, and in which:

FIG. 1 is a side elevational view, partially broken away of a spout applying mechanism according to the present invention;

FIG. 2 is an enlarged longitudinal sectional view through a spout-bending mechanism according to the present invention after a portion of a spout stem has been bent laterally outwardly;

FIG. 3 is an enlarged view of a face of a staking tool of the spout bending mechanism;

FIG. 4 is a side elevational view of a flare tool element of the spout bending mechanism;

FIG. 5 is an end view of the flare tool depicted in FIG. 4; and

FIG. 6 is a longitudinal sectional view through a spout and paperboard container after the stem of the spout has been bent backwardly against an inside surface of the container wall.

DETAILED DESCRIPTION OF THE PREFERRED EMBODIMENT

With reference to FIGS. 1-6 a method of and apparatus for attaching a spout to a planar portion of an article such as a gable top of a paperboard carton will be described hereinbelow. The method and apparatus of the present invention can be integrated into an overall carton forming and filling process, such as described in the afore-mentioned U.S. application Ser. No. 07/657,994, and can be used to form the pour spout attachment disclosed in the afore-mentioned U.S. application Ser. No. 07/753,855 of Abrams, Miller, and Bird. The disclosures of those two applications are hereby incorporated herein by reference.

In the process described in application Ser. No. 07/657,994, a carton is formed with sides and a bottom. A hole is punched into a side of the carton, which side will eventually become a sloping side of the gable top of the carton. Then, a bonding agent is applied to the carton around the hole, and a spout is thereafter inserted into and placed about the hole such that the bonding agent bonds a flange of the spout to the carton side. The carton is then partially folded to form a gable top, and thereafter the carton is filled with a liquid such as juice or milk.

The present invention is particularly concerned with the securement of the spout to the carton so that the spout is better able to resist outward pulling forces.

An apparatus 10 for attaching the spout is depicted in FIG. 1 and includes a frame 12 having a part 11 to which is fixedly mounted the cylinder element 13 of a double-rod fluid ram 14. The ram 12 is preferably actuated pneumatically, i.e., by pressurized air. A piston (not shown) of the ram is fixedly connected to rearwardly and forwardly extending rods 16, 18. The forwardly extending rod 18 is fixedly connected to a spout-attaching base 20. An attaching cup 22 is affixed to the attaching base 20. A suction passage 24 extends from a port 26 to the attaching cup 22. By connecting the port 26 to a suitable source of suction pressure, a suction can be selectively applied at the mouth of the cup 22.

A spout supplying assembly 32 is situated forwardly of the ram 14 for the purpose of positioning spouts S ahead of the attaching cup 22. The spout supplying assembly includes a vertical rail 33 defining a supply passage 34. The lower end of the rail includes a hole 36 into which the front end of the spout attaching base 20 projects. Spouts S are dropped one-by-one into the bottom of the passage 34 by a flow regulating mechanism 40 situated above the attaching base. The operation of that mechanism 32, 40 is explained in detail in the afore-mentioned U.S. application Ser. No. 07/657,994. As a spout reaches the lower end of the passage 34 it is able to be gripped by suction applied to the attaching cup 22 as the ram 14 advances the attachment cup 22.

Hence, the spout S can be removed from the passage 34 and advanced along with the attaching cup 22 in a leftward direction in FIG. 1.

Disposed in front of the lower end of the passage 34 is a leg 44 of the frame 12. Connected to that leg 44 is a positioning piece 46 which includes a downwardly open slot 50 shaped to receive the upper end of a side of a carton as the carton is fed upwardly by a suitable lifting device (not shown) as disclosed in detail in Ser. No. 07/657,994. A lower face 48 of the positioning piece 46 is inclined to define an enlarged mouth leading into the slot 50. Hence, the carton can be guided into the slot 50 even if not initially aligned therewith. In that position, a pre-punched hole in the carton C will be aligned with the attachment cup 22. Consequently, the attaching cup 22 can push a skirt portion B of a spout S through the hole until a radial flange F of the spout abuts an adhesive-coated outer surface A of the carton C (see FIG. 2).

The leg 44 includes an aperture 60 which is aligned with the attachment cup 22. Aligned with the aperture 60 is a spout-bending mechanism 62. That mechanism 62 comprises a double-rod fluid ram 64 which comprises a cylinder 63, an internal piston 65, and forwardly and rearwardly extending rods 66, 68 attached to the piston. The forwardly projecting rod 66 is affixed to an arm 70 of the frame 12 by means of a screw 69. The rearwardly projecting rod 68 is attached to a flare tool 72 by means of a screw 74. It will be appreciated that the rods 66, 68, the piston 65, and the flare tool 72 are fixed immovably to the leg 70, and that the cylinder 63 reciprocates relative to those elements 66, 68, 65, 72 when pressurized fluid is applied to opposite ends of the ram 64.

The flare tool 72, depicted in FIGS. 1, 4 and 5, includes a generally cylindrical body 67 having front and rear ends 69, 71. The front end 69 includes a recess 73 which receives an end of the rearwardly extending rod 68 of the ram 64. The rear end 71 has a double taper around its outer periphery, i.e., a tapered inner surface 73, and a tapered outer surface 75 surrounding the inner surface 73. The inner surface 73 comprises a section of a conical surface having a first cone (apex) angle, and the outer surface 75 comprises a section of a conical surface having a larger, second cone angle.

Attached to a rear end of the ram 64 is a staking tool 76 which is adapted to slide longitudinally upon stationary flare tool 72. The staking tool 76 includes a large-diameter cylindrical portion 74 which is fixed, e.g., by bolts, to the movable cylinder 63, and a smaller-diameter cylindrical portion 77 which has a central bore 78 to receive the flare tool. Hence, the staking tool 76 slides along the outer periphery of the portion 77 of the flare tool 72 when the cylinder 63 of the ram 64 is displaced.

A rear end face 79 of the flare tool depicted in FIGS. 1 and 3 is of ring-shaped configuration and includes a radially inner portion 80 which is of curved profile defined by a radius R (see FIG. 3). The radially outer portion of the face 79 is of conical shape, and extends at an acute angle D relative to vertical V. One preferred end face 79 has a radius R of 0.063 inch, and an angle D of 15 degrees, and the center of the radius R is spaced horizontally from a radially innermost edge of the surface 79 by a distance X of 0.031 inches, and is spaced vertically from that edge by a distance Y of 0.055 inch.

The smallest diameter (and also preferably the largest diameter) of the inner tapered surface 73 of the flare tool is less than the inner diameter of the stem B of the spout S. Preferably, the largest diameter of the inner tapered surface 73 is also less than the inner diameter of the stem B. The largest diameter of the outer tapered surface 75 is larger than the inner diameter of the stem B. Thus, as the stem B, while in a warm, pliable state, is pushed against the end face 71 of the flare tool, an end of the stem B will abut the outer tapered surface 75 and be bent outwardly thereby, as depicted in FIG. 2. If the stem B engages the inner tapered surface 73, it will simply be guided thereby onto the outer tapered surface 75.

The thus-bent portion of the stem B will lie in the travel path of the end face 79 of the staking tool 76. Thus, by subsequently displacing the staking tool rearwardly (i.e., to the right in FIG. 1), the inclined face 79 further bends the stem B back against the carton as depicted in FIG. 6. The finally bent stem includes a curved transition portion B' and an outer flat portion B" which bears against an interior surface A' of the carton C.

The bent-back stroke of the ram 64 is adjusted so as to be terminated when the stem B has been bent back against the carton.

The stem B thus extends radially outwardly beyond the hole H in the carton C to prevent the spout G from being pulled out of the aperture when the cap of the spout is pulled open by the user. It is unnecessary for the bent-back stem to form a liquid-tight seal with the carton, since a fluid seal is formed between the spout flange F and the exterior surface A of the carton.

Actuation of the staking tool 76 is effected by a valve 92 which, in turn, is actuated when the ram 14 has displaced a spout S forwardly against the flare tool 72. In that regard, the rearwardly extending rod 16 of the ram 14 is connected to an arm 94 which is oriented parallel to the rod 16. The arm 94 carries a valve actuator 96 which, upon initial forward movement of the arm 94, moves out of engagement with a spout-control switch 98 to activate the flow regulator 40 in a manner allowing a spout S to fall to the bottom of the passage 34 as described in U.S. application Ser. No. 07/657,994. A suction is applied to the attaching cup 22 (as long as the valve actuator 96 remains out of engagement with a suction shut-off switch 100) to enable the attachment cup 22 to grip a spout by means of the suction force. When the valve actuator 96 moves forwardly, it simultaneously engages both the suction shut-off switch 100 and a staker tool control switch 102 which controls the actuation of the ram 64. Thus, the suction to the applicator cup 22 is discontinued to release the spout, and the staker tool 76 is displaced rearwardly (to the right in FIG. 1) in order to complete the bending of the stem B.

The forward stroke of the ram 14 is terminated by the contact of a stop member 104 against the frame part 11. The stop member 104 is carried by the rearwardly extending rod 16 and is preferably threaded onto an external screw thread of the rod 16 so as to be longitudinally adjustable forwardly and rearwardly.

The spout S can assume various configurations, such as the alternative configurations disclosed in the above-mentioned U.S. application of Abrams, Miller and Bird. Preferably, spout S comprises, in addition to the stem B, a flange F and a snap-off cap G. The pulling forces applied to the spout S when that cap G is pulled off are effectively resisted by the bent-back stem B, as well as by the adhesive connection between the flange F and the carton. If no fluid-tight seal is required between the carton and spout, then the flange F need not be secured by adhesive to the carton.

In operation, a carton C is raised into the slot 50 of the positioning piece 46 in order to longitudinally align the applicator cup 22 with the hole H formed in the carton. A spout S sits at the bottom of the passage 34. The ram 14 is then actuated to advance the applicator cup 22 to the left in FIG. 1. The applicator cup 22 contacts the cap portion C of the spout, whereupon the spout is adhered to the applicator cup by virtue of the suction within the passage 24. Continued movement of the applicator cup to the left causes the stem B of the spout to pass through the hole H of the carton C and then abut against the tapered end face 71 of the flare member 72. As a result of such contact, the end of the stem, which is thin and relatively pliable, is turned radially outwardly into the path of the face 79 of the staking tool 74, as depicted in FIG. 2. Also, the flange F comes into contact with the exterior surface A of the carton and can become bonded thereto if adhesive is applied to either the flange or the exterior surface.

As the spout S is being inserted into the carton, the valve actuator 96 moves out of engagement with the spout control valve 98, whereupon the spout control mechanism 40 permits the next spout S to fall to the bottom of the passage 34.

When the stop member 104 traveling with the rearwardly extending rod 16 of the ram 14 abuts against the frame part 11, forward travel of the applicator cup 22 is terminated. Simultaneously, the valve actuator 96 actuates the switches 100, 102, causing the suction in the actuator cup 22 to be terminated, and the ram 64 to be actuated in a manner extending the staking tool toward the carton, i.e., to the right in FIG. 1. Consequently, the end face 79 of the staking tool 76 engages the turned or bent portion of the stem B and pushes it against the interior wall A' of the carton, whereupon the bent portion assumes the configuration shown in FIG. 6. As a result, the bent portion of the stem is able to resist outward pulling forces applied to the spout as a user attempts to snap open the cap G.

During the deforming of the stem, the ram 14 remains in its extended position (to the left in FIG. 1) to push against the spout as the staking tool pushes in an opposite direction (to the right) against the stem. Thereafter, the ram 14 is actuated by a suitable switch (not shown) to be retracted.

It will be appreciated that the bending of the stem is accomplished without the need for thermal or ultrasonic devices. The arrangement of the flare tool 72 and the staking tool 76 is compact and occupies little space, enabling the mechanism to be retrofited to a standard packaging machine, such as the Cherry-Burrell packaging machine described earlier herein.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method of attaching a spout to a wall of an article comprising the steps of:
   positioning said article wall and a spout at predetermined positions relative to one another;
   inserting a stem of said spout longitudinally through a pre-formed hole in said article wall and against an inclined face of a flare tool so that a portion of said stem is bent laterally outwardly and into the path of a face of a staking tool; and
   producing relative movement between said flare tool and said staking tool so that said face of said staking tool bends said bent portion back against said article wall.

2. A method according to claim 1, wherein said producing step includes pressing a laterally outer section of said bent portion against said wall while leaving a laterally inner section of said bent portion spaced longitudinally from said wall.

3. A method according to claim 1, wherein said inserting step comprises inserting a generally cylindrical stem of said spout against an annular face of said flare tool.

4. A method according to claim 3, wherein said producing step comprises producing relative longitudinal movement between said annular face of said flare tool and an annular face of said staking tool which coaxially encircles said annular face of said flare tool.

5. A method according to claim 4, wherein said producing step comprises longitudinally moving said staking tool while holding said flare tool and said wall stationary.

6. A method according to claim 1, wherein said inserting step comprises inserting a stem of said spout longitudinally through said hole until a lateral flange of said spout abuts against a surface of said article wall disposed opposite a surface of said article wall contacted by said bent portion.

7. A method according to claim 6, wherein adhesive is applied to one of said flange and said article wall to adhesively secure said flange to said wall.

8. A method according to claim 1, wherein said inserting step comprises adhering said spout to a longitudinally reciprocable applicator by means of air suction, and longitudinally displacing said applicator toward said hole.

9. A method of attaching a spout to a gable top of a paperboard carton, comprising the steps of:
   providing a paperboard blank which is to form a carton, a portion of said blank forming a gable top of the carton,
   positioning a spout and said portion of said blank at predetermined positions relative to one another;
   inserting a stem of said spout longitudinally through a pre-formed hole in said article wall and against an inclined face of a flare tool so that a portion of said stem is bent laterally outwardly and into the path of a face of a staking tool which encompasses said flare tool; and
   sliding said staking tool along an outer surface of said flare tool so that said face of said staking tool bends a laterally outer section of said bent portion back against said article wall while leaving a laterally inner section of said bent portion spaced longitudinally from said wall.

10. A method according to claim 9, wherein said inserting step comprises inserting a stem of said spout longitudinally through said hole until a lateral flange of said spout abuts against a surface of said article wall disposed opposite a surface of said article wall contacted by said bent portion.

11. A method according to claim 10, wherein adhesive is applied to one of said flange and said article wall to adhesively secure said flange to said wall.

12. A method according to claim 9, wherein said inserting step comprises adhering said spout to a longitudinally reciprocable applicator by means of air suction, and longitudinally displacing said applicator toward said hole.

13. Apparatus for attaching a spout to a wall of an article comprising:
   means for positioning an article wall and a spout at predetermined positions relative to one another;
   a spout applicator for inserting a stem of the spout longitudinally through a pre-formed hole in the article wall;
   a flare tool having a face arranged to contact the stem once the stem passes through the hole, and bend a portion of the stem laterally outwardly;
   a staking tool having a face arranged to oppose the bent portion of the stem;
   means for producing relative movement between said flare tool and said staking tool such that said face of said staking tool bends the bent portion of the skirt back against the article wall.

14. Apparatus according to claim 13, wherein said staking tool is mounted on an outer periphery of said flare tool for longitudinal sliding movement relative thereto.

15. Apparatus according to claim 14, wherein said face of said staking tool is ring-shaped and encircles said flare tool, said face of said staking tool including a radially inner portion of concave shape defined by a radius of curvature, and a radially outer portion of generally conical shape extending from a radially outer end of said inner portion.

16. A method according to claim 15 including a powered actuator operably connected to said staking tool for longitudinally sliding said staking tool, a switch for energizing said actuator, and means movable with said spout applicator for operating said switch.

17. Apparatus according to claim 13, wherein said face of said flare tool includes a pair of tapered surfaces arranged coaxially relative to one another, a radially inner one of said tapered surfaces defining a first cone angle, and a radially outer one of said tapered surfaces defining a second cone angle larger than said first cone angle, said outer tapered surface extending to an outer periphery of said flare tool.

18. Apparatus according to claim 13, wherein said spout applicator includes suction means for gripping a spout by suction, said applicator being longitudinally movable for inserting said stem.

19. Apparatus for attaching a spout to a gable top of a paperboard container comprising:
   means for positioning a spout and a portion of a paperboard blank at predetermined positions relative to one another;
   a spout applicator for gripping a spout by suction, said applicator being longitudinally movable for inserting a stem of the spout longitudinally through a pre-formed hole in the blank portion;
   a flare tool having an inclined face arranged to contact the stem once the stem passes through the hole, and bend a portion of the stem laterally outwardly;
   a staking tool encompassing said flare tool and being slidable relative thereto, said staking tool having a face arranged to oppose the outwardly bent portion of the stem; and
   means for sliding said staking tool such that said face of said staking tool bends a laterally outer section of the bent portion of the skirt back against the article wall while leaving a laterally inner section of said bent portion spaced longitudinally from said wall.

20. Apparatus according to claim 19, wherein said face of said staking tool includes a radially inner portion of concave shape defined by a radius of curvature, and a radially outer portion of generally conical shape extending from a radially outer end of said inner portion.

21. A method according to claim 20 including a powered actuator operably connected to said staking tool for longitudinally sliding said staking tool, a switch for energizing said actuator, and means movable with said spout applicator for operating said switch.

22. Apparatus according to claim 19, wherein said face of said flare tool includes a pair of tapered surfaces arranged coaxially relative to one another, a radially inner one of said tapered surfaces defining a first cone angle, and a radially outer one of said tapered surfaces defining a second cone angle larger than said first cone angle, said outer tapered surface extending to an outer periphery of said flare tool.

* * * * *